Feb. 2, 1971 L. S. NAPOLI ET AL 3,560,887
DIRECTIONAL FILTER COMPRISING A RESONANT LOOP
COUPLED TO A TRANSMISSION LINE PAIR
Filed Aug. 21, 1969
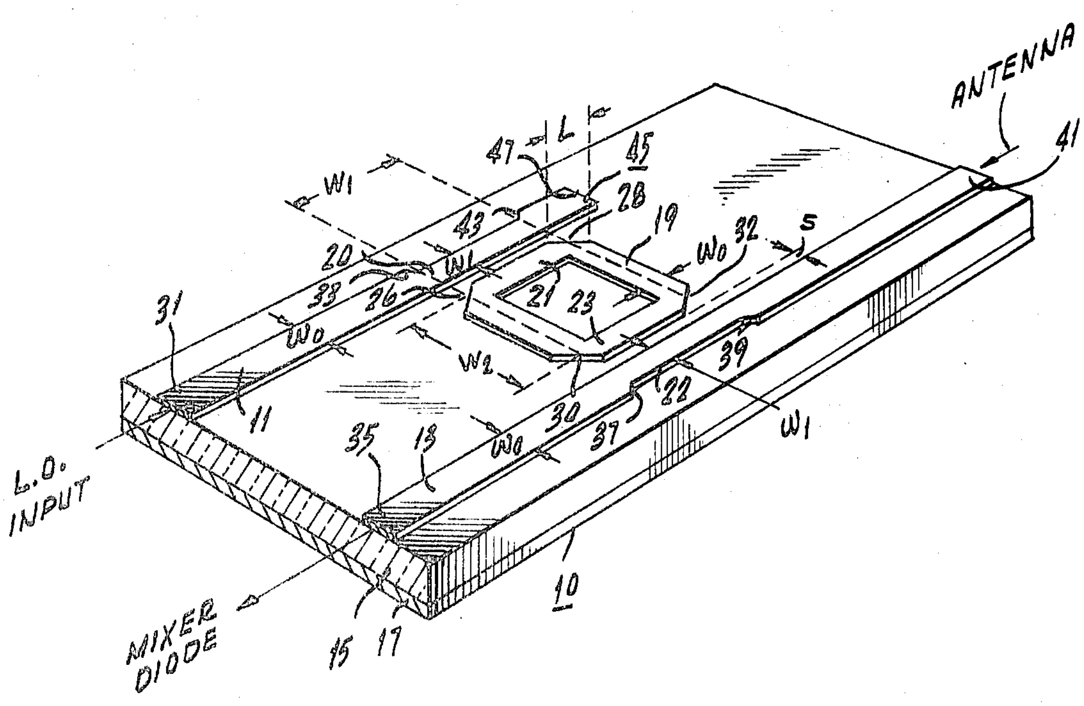
INVENTORS
LOUIS S. NAPOLI &
JOHN J. HUGHES
BY Robert L. Troike
ATTORNEY

United States Patent Office 3,560,887

Patented Feb. 2, 1971

3,560,887

DIRECTIONAL FILTER COMPRISING A RESONANT LOOP COUPLED TO A TRANSMISSION LINE PAIR

Louis Sebastion Napoli, Trenton, and John Joseph Hughes, Spotswood, N.J., assignors to RCA Corporation, a corporation of Delaware Filed Aug. 21, 1969, Ser. No. 851,860
Int. Cl. H01h 7/04; H01p 3/08, 5/14
U.S. Cl. 333—10 4 Claims

ABSTRACT OF THE DISCLOSURE

A directional filter includes a resonant loop between a pair of narrow microstrip transmission lines. An open circuit stub at the end of one of the lines extends a particular distance beyond the immediate coupling region between that line and the resonant loop.

This invention relates to directional filters, and more particularly to microstrip transmission line directional filters.

Directional filters are now being used in a number of applications. They are used to provide selection of a signal within a given frequency band and also to combine signals of one frequency with another, the resultant signal then being directed in a certain direction. Recent developments in the art require structures which lend themselves to what is termed microwave integrated circuits, namely, devices which comprise a single dielectric substrate with a wide planar conductor on one surface of the substrate and at least a narrow conductor on the opposite surface of the substrate.

Directional filters which provide directional coupling between lines by means of a loop type resonator are known and are described, for example, by Cohn in Pat. No. 2,922,123. In the previous known loop type resonator, directional filters, the ends of the two lines of the filter are connected to or terminate at their characteristic impedances external of the filter structure per se, resulting in a symmetrical terminal arrangement. When such an arrangement is of the single substrate, single ground plane (microstrip) transmission line configuration, the directionality has been shown to be so very poor that poor isolation between the terminals exists, rendering the directional filter substantially useless for most applications.

It is an object of the present invention to provide an improved resonant loop type of directional filter.

A directional filter is provided having a single substrate of dielectric material, a conductive ground plane on one side of the substrate and narrow conductive strips on the opposite side of the substrate. The pair of narrow conductive strips are located in spaced relations to each other to form with the conductive plane on the opposed surface a pair of transmission lines along which electromagnetic wave energy can be propagated. A resonant loop is positioned on the side of the substrate including the narrow conductors and is spaced between the pair of narrow strip conductors to create an energy coupling region therebetween. An open circuit stub at the end of one of the lines extends a particular distance beyond and outside of the immediate coupling region provided by the positioning of the loop between the lines.

A more detailed description follows in connection with the accompanying drawing wherein one embodiment of a directional filter 10 according to the invention is shown. The directional filter 10 includes metallic, narrow strip conductors 11 and 13 on one surface of a dielectric substrate 15. On the opposite surface of substrate 15 is a metallic planar conductor 17, covering the entire undersurface of the substrate 15 and acting as the ground plane for the narrow strip conductors 11 and 13. A resonant loop 19 having a total effective length equal to one wavelength at the mid-bandpass frequency is positioned between the narrow strip conductors 11 and 13 for providing the desired frequency selective coupling between strip conductors 11 and 13. The loop 19 is shaped so as to have portions or arms 21 and 23 thereof parallel to portions 20 and 22 of narrow strip conductors 11 and 13, respectively, and arranged close thereto so as to couple therewith. The mean circumferential current path of the loop 19 can be represented by the equation $$2W_1+2W_2=\frac{c}{\sqrt{\epsilon_\gamma f_0}}\times\left(\frac{\lambda}{\lambda TEM}\right)$$

where $W_1$ is the mean length (points 26 to 28 and 30 to 32) of the arms 21 and 23 of the loop 19; $W_2$ is the length of the arms of the loop 19 between the points 26 and 30 and 28 and 32 of the loop 19;

$\lambda/\lambda$TEM is wavelength modification for microstrip defined by Coulton, Hughes and Sobol in RCA Review, September 1968, Vol. XXVII, No. 3, pp. 377 through 391 and is equal in the specific arrangement described herein to 1.23;

$\epsilon_\gamma$=relative dielectric constant of the susbtrate;

C is velocity of light; and $f_0$=resonant frequency.

Maximum coupling occurs when $W_1$ is made about equal to one-quarter the operating frequency wavelength which, by way of example can be 8.5 gHz. and in such case would be 130 mils. long. The width of a transmission line ($\omega$) determines the characteristic impedance of the transmission line. In the example illustrated, the width $\omega_0$ of the line 11 from point 31, corresponding to the terminal of line 11 on the substrate 15, to the beginning of the one-quarter wave section 20 at point 33 is made 24.5 mils. so as to provide a characteristic impedance of 50 ohms. Likewise the width of line 13 from point 35, corresponding to the terminal at the left end of line 13 on the substrate 15, to the beginning of the one-quarter wave section 22 at point 37 and from the end of the one-quarter wave section 22 at point 39 to point 41, corresponding to the terminal at the right end of line 13 on the substrate 15, is of the same width 24.5 mils. to provide a characteristic impedance of 50 ohms. The width of the arms of the loop 19 along dimension $W_2$ is likewise made the same width ($\omega_0$) or 24.5 mils. to provide the characteristic impedance of 50 ohms. The width $\omega_1$ of the lines 11 and 13 between points 33 and 43 of line 11 (portion 20) and between points 37 and 39 of line 13 (portion 22) and the portions 21 and 23 of resonant loop 19 are adjusted so that the proper characteristic impedance is maintained over the coupling region. In the present example, the width $\omega$ is 17.5 mils. The substrate 15 is 25 mils. thick alumina material having a dielectric constant of about ten. The thickness of the ground plane conductor 17 and the thickness of each of the narrown conductors 11, 13 and 19 is approximately 2 microns. Terminal points 31, 35 and 41 for the respective lines 11, 13 are terminated at their characteristic impedances or 50 ohms of suitable means not shown in accordance with the application made of the filter described.

Transmission line 11 at its end opposite that at terminal 31 terminates at an open circuited transmission line section 45 which extends a short distance L beyond point 43 (which is the end of the one-quarter wavelength close coupling section 20) to point 47. Section 45 extends in the above-described example 52 mils. from point 43 to point 47. This length is equal, in the operating medium described above, to about one-tenth of a wavelength at the mean loop or bandpass frequency of 8.5 gHz. The width $\omega_0$ of the section 45 is 24.5 mils. to make the characteristic impedance of this open circuited section about 50 ohms. The spacing S between the loop 19 and portions 20 and 22 of lines 11 and 13 in the described example was about 7 mils. to provide about 3 db coupling of the lines at center bandpass frequency of the filter.

In operation, a traveling wave signal is propagated along narrow strip conductor 11 from terminal point 31. The loop 19 operates to cause a traveling wave to be propagated in the opposite direction (from point 39 to point 35) along the transmission line 13 at the selected frequency of the loop. When operating at a frequency of 8.5 gHz., the directionality, frequency selectivity and coupling of this improved structure is such as to provide greater than 30 db of isolation between terminal points 35 and 41.

This isolation becomes extremely desirable in cases where the directional filter is used, for example, as part of the mixer circuit of a receiver. In this situation, the input signal, off resonance of the filter, from an antenna, not shown, is fed into the filter at terminal point 41 and fed from the filter at terminal point 35 where a mixed diode, not shown, is located. A local oscillator, not shown, operating at the resonant frequency of the filter coupled to the terminal point 31 supplies the frequency selective beat signal to derive the desired IF at the mixer diode. By the use of the section 45 which extends about one-tenth of a wavelength at the loop bandpass frequency beyond the one-quarter wavelength coupling portion 20, greater than 30 db of isolation between terminal points 35 and 41 is obtained. In a practical application, the section 45 instead of extending only one-tenth of a wavelength beyond the end of the coupling portion 20 may extend by additional one-half wavelength sections, making the length of the section 45 approximately equal to $n\lambda/2+\lambda/10$, where $n$ is the number of one-half wavelength sections. Without the section 45 less than about 3 db of isolation would be obtained between the terminal points 35 and 41.

What is claimed is:

1. A directional filter comprising, a pair of transmission lines having a given characteristic impedance each extending between first and second ends of said lines, a resonant loop transmission line spaced between said lines so as to be closely coupled to a first one of said lines along a portion thereof and to be closely coupled to the second of said lines along a portion thereof, the first end of said first transmission line extending as an open circuit stub only a distance approximately equal to $n\lambda/2+\lambda/10$ beyond the portion thereof closely coupled to said loop, where $n$ equals the number of one-half wavelength and $\lambda$ equals the length of a wave at the operating frequency of said loop in said transmission line, the second end of said first transmission line and both ends of said second transmission line being terminateable at their characteristic impedance external to said filter.

2. A directional filter comprising, a susbtrate of dielectric material, a planar conductor covering one surface of said substrate, a first narrow conductive strip and a second narrow conductive strip located in spaced relation on a seccond surface of said substrate opposite to said one surface, each of said strips forming with said planar conductor a transmission line having a given characteristic impedance along which electromagnetic wave energy may be propagated, a third narrow conductive strip formed in a resonant conductive transmission line loop on said opposite surface and spaced between said first and second strips so that said loop is closely coupled to said first strip along a portion thereof and is closely coupled to said second strip along a different portion thereof, one end of said first strip extending only a distance approximately equal to $n\lambda/2+\lambda/10$ beyond the portion thereof closely coupled to said loop, where $n$ equals the number of one-half wavelengths and $\lambda$ equals the wavelengths in the first transmission line at the operating frequency of said loop, the second end of said first strip and both ends of said second strip being connectable at their characteristic impedances external to said filter.

3. A directional filter as claimed in claim 2 and wherein said third strip is formed as a four-sided loop with one side being parallel to and in closely spaced coupling relation along a portion of said first strip, the side of said loop opposite said one side being parallel to and in closely spaced coupling relation along a portion of said second strip.

4. A directional filter as claimed in claim 3 and wherein said first and second strips are located on said opposite surface of said substrate in spaced parallel relation.

References Cited

UNITED STATES PATENTS 2,922,123 1/1960 Cohn ______________ 333—84X

HERMAN KARL SAALBACH, Primary Examiner

M. NUSSBAUM Assistant Examiner

U.S. Cl. X.R.

333—73, 84; 325—445